United States Patent [19]
Austin et al.

[11] Patent Number: 5,531,283
[45] Date of Patent: Jul. 2, 1996

[54] DRIVETRAIN AND LOAD BEARING SWIVEL HITCH ASSEMBY AND COMBINE INCORPORATING SAME

[75] Inventors: Gregg A. Austin; Gary E. Coppock, both of Selma, Ala.

[73] Assignee: Bush Hog Corporation, Selma, Ala.

[21] Appl. No.: 297,602

[22] Filed: Aug. 29, 1994

Related U.S. Application Data

[63] Continuation of Ser. No. 98,135, Jul. 28, 1993, Pat. No. 5,355,971.

[51] Int. Cl.⁶ .................................................. B60K 17/28
[52] U.S. Cl. ...................... 180/53.1; 180/53.3; 280/494; 56/15.7
[58] Field of Search .......................... 180/53.1, 53.3, 180/53.6, 14.4; 280/492, 494; 56/14.7, 15.6, 15.7, DIG. 14; 172/47, 125

[56] References Cited

U.S. PATENT DOCUMENTS

| | | | |
|---|---|---|---|
| 1,496,999 | 6/1924 | Ray | 56/12.6 |
| 1,661,737 | 3/1928 | Raimer | 180/14.4 |
| 1,706,742 | 3/1929 | Raimer et al. | 180/53.1 |
| 4,366,877 | 1/1983 | Vissers et al. | 180/53.1 |
| 4,525,987 | 7/1985 | Werner et al. | 56/15.2 |
| 4,714,123 | 12/1987 | Ermacora et al. | 180/14.4 |
| 4,738,461 | 4/1988 | Stephenson et al. | 280/400 |
| 4,793,430 | 12/1988 | Stephenson et al. | 180/14.4 |
| 4,805,927 | 2/1989 | Stephenson et al. | 172/47 |
| 4,838,015 | 6/1989 | Mouret et al. | 56/15.7 |
| 4,860,526 | 8/1989 | Hottes | 56/13.6 |
| 4,923,014 | 5/1990 | Mijnders | 172/2 |
| 5,138,826 | 8/1992 | Hobbs | 56/14.6 |
| 5,146,737 | 7/1992 | Gantzer | 56/DIG. 14 X |
| 5,152,357 | 10/1992 | McLean et al. | 180/53.1 X |

FOREIGN PATENT DOCUMENTS

| | | |
|---|---|---|
| 27295 | 4/1981 | European Pat. Off. . |
| 330021 | 7/1958 | Switzerland . |
| 608120 | 10/1948 | United Kingdom . |

OTHER PUBLICATIONS

Vicon High–performance mower–conditioners KM 241–281–321.
Gyrodine Swivel Hitch: Speed and maneuverability! Comfort and Safety!
Taarup Attelage pivotant 306–307–306B–307B–306R–307R.
Taarup 206R/307R—Conditionneur a rouleaux—Attelage a tete pivotante.
Rotary Mower/Conditioners—Three rotary disk machines cut and condition all kinds of tough stuff.
Fort Mower conditioner windrower pull type F14/6 TS.
Krone—Disc mowers AMG 282 Z2 of C—the Krone development for high work rates at a low power consumption and high forage quality.

*Primary Examiner*—Kevin T. Hurley
*Attorney, Agent, or Firm*—Lockwood, Alex, Fitzgibbon & Cummings

[57] ABSTRACT

A drivetrain and load bearing swivel hitch assembly is provided which separates the load carrying function from the power transmitting function and features a swivel hitch assembly having three axes of rotation which allow for roll, pitch and yaw movement, respectively. One end of the load bearing swivel hitch assembly is secured to an implement such as a peanut combine, while the other end is securely joined to the drawbar of a pulling vehicle such as an agricultural tractor in a manner such that the draft and tongue load are not borne by the drivetrain assembly. Drivetrain assembly includes a swivel gearbox having a generally vertical axis above the generally vertical yaw axis of the load bearing swivel hitch assembly. Combines incorporating this drivetrain and load bearing swivel hitch assembly are also provided in order to present combines that will maintain the proper operational angle for combine operation irrespective of the tractor type or size used as the pulling vehicle.

30 Claims, 5 Drawing Sheets

DRIVETRAIN AND LOAD BEARING SWIVEL HITCH ASSEMBY AND COMBINE INCORPORATING SAME

This application is a continuation of application(s) Ser. No. 098,135, filed Jul. 28, 1993 U.S. Pat. No. 5,355,971.

DESCRIPTION

1. Background and Description of the Invention

The present invention generally relates to a swivel hitch apparatus which is particularly well suited for agricultural implements presenting a substantial draft load, such as combines. More particularly, the invention relates to an assembly of a load bearing swivel hitch and an associated drivetrain which is especially well suited for peanut combines. The invention also includes combines incorporating the drivetrain and swivel hitch. The load bearing swivel hitch accommodates the draft load and operatively connects to the drawbar of a pulling vehicle such as an agricultural tractor. The swivel hitch assembly allows for three degrees of freedom between the implement and the pulling vehicle, while the drivetrain assembly includes a swivel gearbox that exhibits one of these degrees of freedom and that is operatively connected to a portion of the swivel hitch assembly so as to rotate therewith. The drivetrain assembly accommodates the other two degrees of freedom of the swivel hitch assembly without bearing any significant portion of the load.

Numerous options are available for securing pull-behind agricultural implements or the like to vehicles for transporting them through fields and along roadways. Typically, when the terrain over which the implement is to be pulled is relatively flat, a simple hitch arrangement often will suffice. However, in those instances where the terrain is not particularly even, which is often the case in many cultivated farmland locations, a more sophisticated approach is desirable. When the implement to be pulled has working components that also need to be driven for operation of the implement, the driving is usually accomplished by the use of a drivetrain between a power supply means, such as a rotating power takeoff drive of a tractor, and the implement being pulled, thereby further complicating the attachment task.

Various approaches have been proposed and/or carried out in the past which include swivel drivetrains having three degrees of freedom of movement designed to accommodate vehicle and implement turning and variations in terrain across which the vehicle and implement travel. Heretofore, these arrangements have largely required the drivetrain itself to shoulder much, if not all of the draft load. Arrangements of this type can be more than adequate for implements which possess relatively low draft loads, for example hay working tools.

Exemplary patents in this regard include prior art U.S. Pat. No. 4,366,877, U.S. Pat. No. 4,738,461 and U.S. Pat. No. 4,793,430. Drivetrains such as illustrated in these patents are not well suited for implements with substantial draft loads. They either transfer the implement draft load and tongue load through the drive assembly which places more stress on the drive components and/or they are designed for connection to the three-point hitch of the vehicle, rather than to its drawbar. Attachment to a three-point hitch is undesirable for use with certain implements such as peanut combines which are to be maintained at or near an optimum operational angle, and because the three-point hitch arrangements of certain tractors will not allow for maintenance of an implement angular orientation with respect to the ground that presents the optimum operational angle. In some instances devices of the types in some prior art have sliding components or the like to provide for movement between components of the assembly which must occur for the apparatus to properly function when moving along an uneven terrain. Also, prior art approaches often require the need to adjust the length of the power take-off shaft, such as by cutting off a portion of its length, in order to accommodate different types or models of tractors, which is particularly undesirable in those situations where the implement could be used with different tractors.

The present invention avoids these types of difficulties. Important in this regard is the complete separation of the hitch or draft load bearing function from the drivetrain function, while providing adequate operative interengagement therebetween so that rotation of the drivetrain assembly is tied to rotation of the load bearing swivel hitch assembly and such that the drivetrain has adequate flexibility to accommodate other movements of the swivel hitch assembly as the vehicle and implement are driven along uneven terrain.

In summary, the drivetrain and load bearing swivel hitch assembly according to the invention separates load carrying from power transmitting and features a swivel hitch assembly having three axes of rotation which impart freedom of movement for roll, pitch or yaw, respectively. This swivel hitch assembly operatively joins the implement to a pulling vehicle drawbar whereby the implement draft load and tongue load are borne by the swivel hitch assembly and the vehicle drawbar. A drivetrain assembly having a swivel gearbox is provided for transmitting power from the power takeoff shaft or the like of the vehicle to the implement in order to provide operational power to the implement. The swivel gearbox and a portion of the swivel hitch assembly are in operative engagement such that the drivetrain will follow rotation of the swivel hitch assembly along at least one axis. The drivetrain assembly also accommodates movement of the swivel hitch assembly along the other degrees of freedom so that driving will continue during roll, pitch and/or yaw. The invention also encompasses combines and the like that incorporate this drivetrain and load bearing swivel hitch assembly which successfully constantly maintains the combine or the like at a desirable operational angle with respect to horizontal.

It is general object of the present invention to provide an improved combination drivetrain and load bearing swivel hitch assembly, as well as combines and the like incorporating same.

Another object of this invention is to provide an improved attachment and drive apparatus which separates the three hitch movements of roll, pitch and yaw and which, at any given pivot point, allows complete freedom for either roll, pitch or yaw while rigidly restricting the other two.

Another object of the present invention is to provide an improved drivetrain and load bearing swivel hitch apparatus and combine incorporating same which avoid attachment through a three-point hitch of a tractor for pulling the combine and the consequent disruption of a proper operational angle of the combine.

Another object of the present invention is to avoid the need to cut power takeoff drive shafts to fit a swivel hitch drive arrangement.

Another object of this invention is to provide an improved apparatus in which all of the implement draft and tongue load is transferred to the tractor or other driving vehicle through a load bearing swivel hitch assembly.

Another object of this invention is to provide an improved swivel hitch apparatus in which the drivetrain absorbs only the drivetrain in-line thrust load and the torque being transmitted thereto by the power takeoff shaft, but no undesirable amount of implement draft or tongue load.

These and other objects, features and advantages of this invention will be clearly understood through a consideration of the following detailed description.

BRIEF DESCRIPTION OF THE DRAWINGS

The invention will be further elucidated in the following description with reference to the drawings in which.

DESCRIPTION OF THE PARTICULAR EMBODIMENTS

Figure 1:
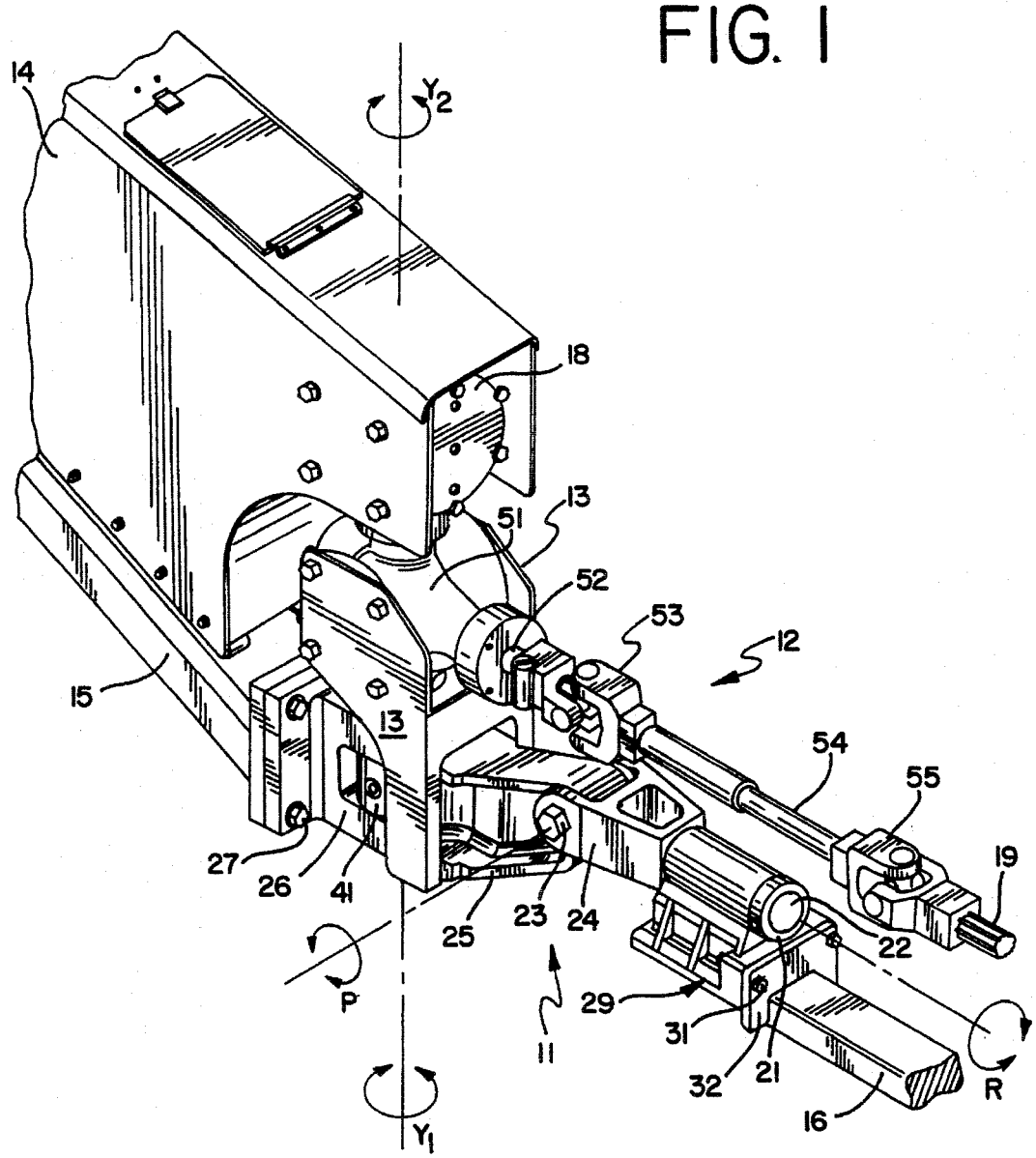
FIG. 1 is a perspective view of a preferred embodiment of the drivetrain and load bearing swivel hitch assembly according to the present invention, shown connected to cut-away portions of an implement and of a tractor.
Figure 2A:
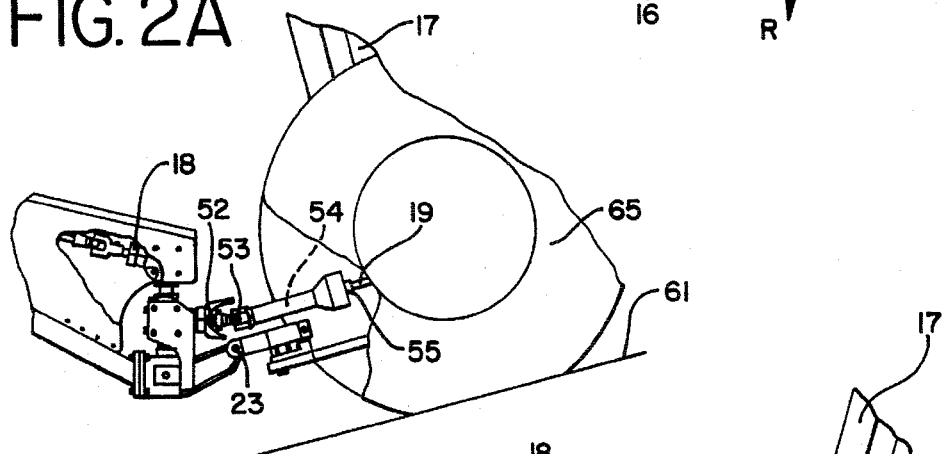
FIG. 2A is a side elevational view along the lines of FIG. 2 and illustrating orientation of the apparatus at a terrain location where the vehicle is at an elevational higher than the implement.
Figure 2B:
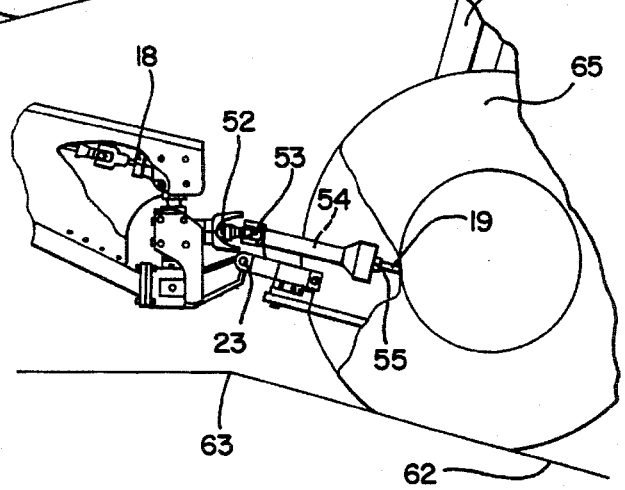
FIG. 2B is a side elevational view along the lines of FIG. 2 and illustrating orientation of the apparatus at a terrain location where the vehicle is at an elevational lower than the implement.
Figure 2:
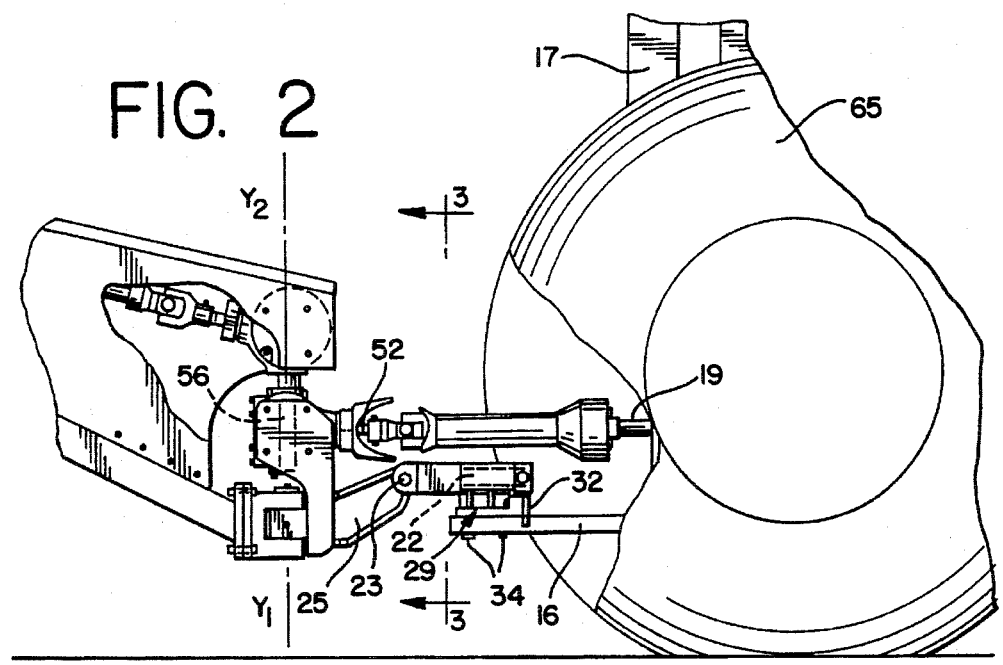
FIG. 2 is a side elevational view of the device illustrated in FIG. 1, shown traversing level terrain.

A load bearing swivel hitch assembly in accordance with this invention is generally designated in FIG. 1 by reference numeral 11, and its associated drivetrain assembly is designated by reference numeral 12. It will be noted that swivel hitch assembly and drivetrain assembly are operatively connected to each other by torque arms 13. Swivel hitch assembly 11 is secured directly to a pull-type implement 14, preferably by being directly and securely attached to the implement's tongue 15. The other, forward-facing end of the swivel hitch assembly 11 is directly secured to a drawbar 16 of a pulling vehicle, such as tractor 17 (FIG. 2). The drivetrain assembly 12 is attached to a gearbox 18 of the implement 14, while its other, forward-facing end is secured to the power takeoff shaft 19 of the pulling vehicle 17.

Figure 3:
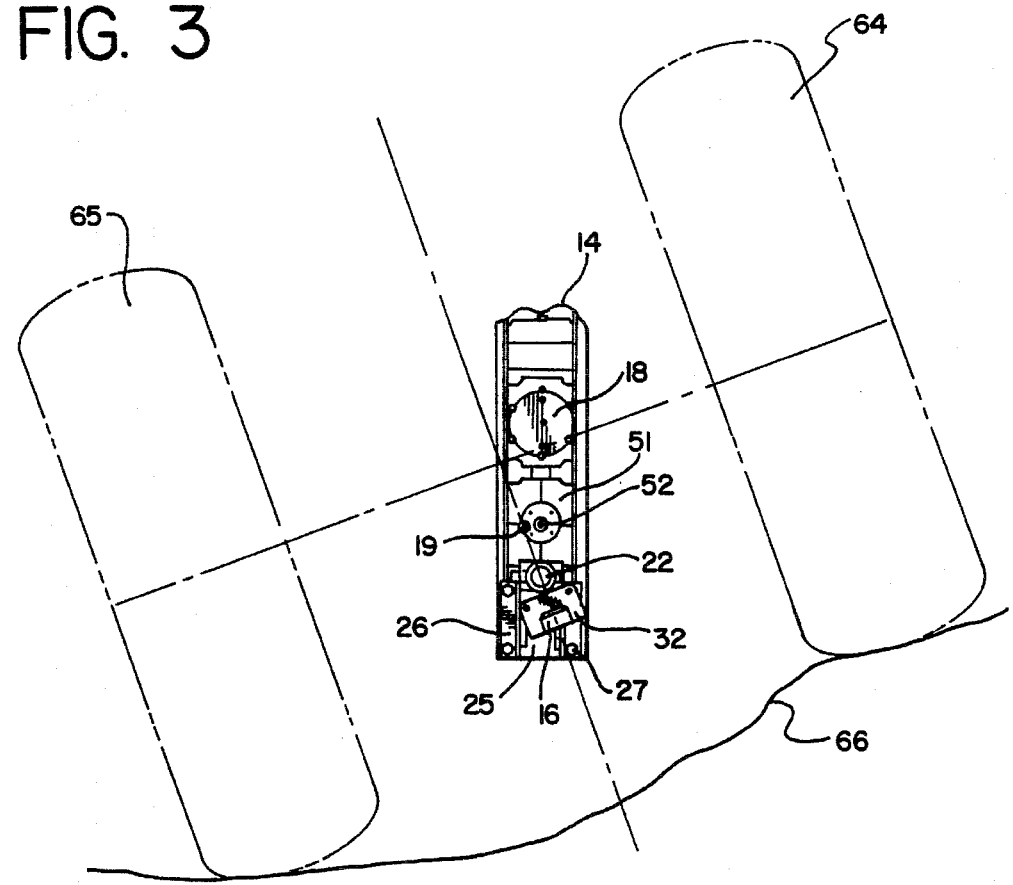
FIG. 3 is a front elevational view of the apparatus of FIG. 1 and schematically illustrating longitudinal swivelling movement that is effected when moving over uneven terrain where one wheel of the tractor is substantially higher than another wheel while the implement is on essentially level ground.
Figure 4:
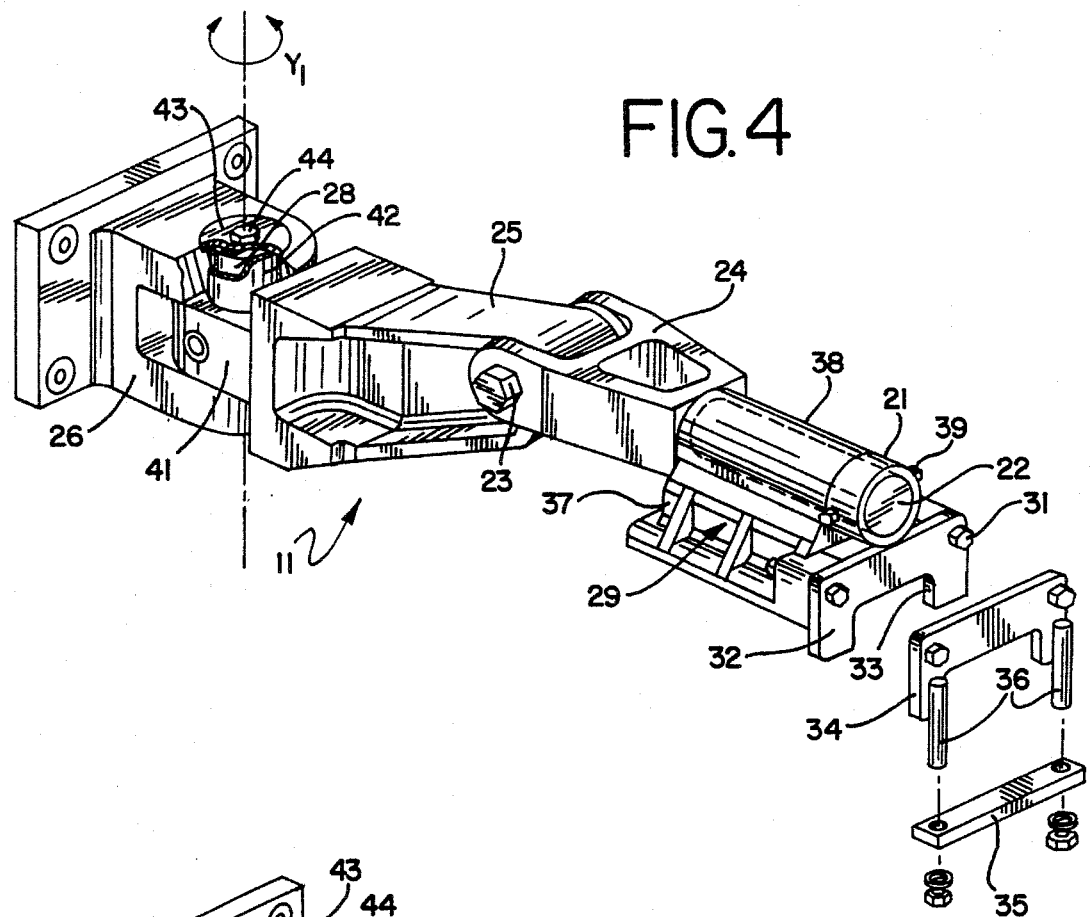
FIG. 4 is an enlarged perspective view of the load bearing swivel hitch assembly illustrated in FIG. 1.

With more particular reference to the load bearing swivel hitch assembly 11, the implement draft and tongue load is transferred to the pulling vehicle through this swivel hitch assembly while providing three degrees of freedom of movement which permits roll, pitch and yaw movement. Roll hitch movement is designated by axis R, which coincides with the central axis of a collar 21 and of a clevis pin 22 (FIGS. 2, 3 and 4). Pitch axis P lies along a tongue extension pin 23 which joins clevis 24 to a tongue extension 25 of the tongue clevis 26, which is secured such as by bolts 27 to the implement tongue 15. Yaw axis Y1 lies along the central axis of a tongue clevis pin 28 (FIG. 4) mounted within the tongue clevis 26.

A drawbar adaptor 29 is rotatably mounted to clevis pin 22. A drawbar adaptor plate 32 is preferably provided to help prevent rotation of the drawbar adaptor 29 on the pulling vehicle drawbar 16. In this regard, a notch 33 (FIG. 4) is provided and sized to accommodate various widths of drawbars. Drawbar adaptor 29 is securely fastened to the drawbar 16 such as by bolts 34 (FIG. 2). When the pulling vehicle is a tractor that does not comply with American Society of Agricultural Engineers (ASAE) guidelines, an optional adaptor assembly can be used, such as the one illustrated in FIGS. 4 and 5. Included is an adaptor clamp 34 and a clamp bar 35 which is secured to pins 36 of the adaptor clamp 34 as illustrated. This allows the load bearing swivel hitch assembly 11 to be clamped onto such a drawbar. If desired, this assembly could be also used for attaching the swivel hitch assembly to other pulling vehicles, including those which might meet ASAE guidelines and could even be used in association with other attachment means such as the bolts 34.

With particular reference to FIG. 4, drawbar adaptor 29 includes a plate component 37 that engages the drawbar and a tube component 38 that receives the clevis pin 22 which rotates within the tube component 38. Collar 21 is secured, such as by bolts 39, onto the forward end portion of the clevis pin 22. Collar 21 thus acts as a restraining means for the draft load. It will be noted that the implement draft load is closely spaced above the drawbar 16, which assists in maintaining tractor stability. In addition, the tongue extension pin 23 is also relatively close to the drawbar 16, which is advantageous, the tongue extension pin 23 being the location of the effective tongue load on the drawbar 16.

Tongue extension pin 23 rotatably secures the clevis 24 to the tongue extension 25. Tongue extension 25 has a rearwardly facing projection 41 which rigidly houses a bushing 42. Bushing 42 rotatably receives the tongue clevis pin 28. Assembly of the projection 41 and thus of the tongue extension 25 to the tongue clevis 26 includes the use of assembly components such as the illustrated pin cap 43 and bolt 44.

Figure 5:
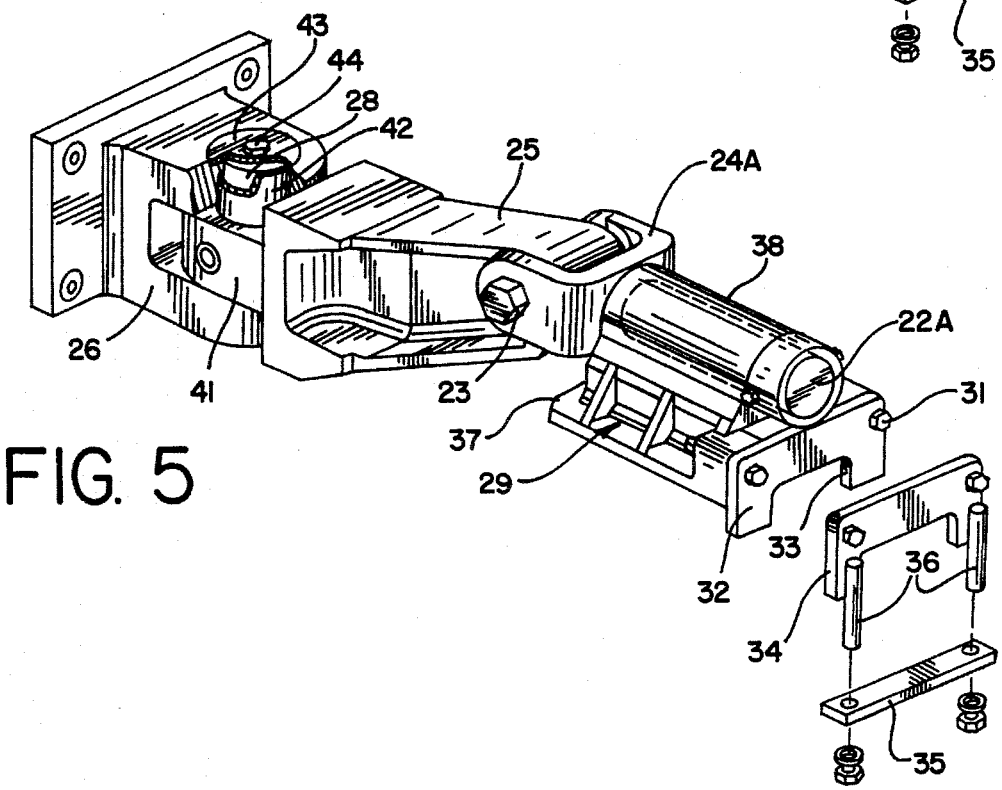
FIG. 5 is a perspective view of an alternative embodiment of a load bearing swivel hitch assembly in accordance with the present invention.

Concerning the alternate embodiment illustrated in FIG. 5, this utilizes a modified clevis 24A and its associated clevis pin 22A. This arrangement is particularly useful when the pulling vehicle 17 is a tractor having a 1¾ inch, 20 spline power takeoff. The embodiment illustrated in FIG. 4 is particularly suitable for use with a tractor that has a 1⅜ inch 21 spline power takeoff. The primary difference between the two clevis members 22 and 22A is the length of each of them. These different clevis members 24, 24A allow the use of a drivetrain assembly 12 which is of the same length irrespective of which tractor is used as the pulling vehicle. This also maintains the same orientation between the power takeoff shaft 19 and an implement input connection 52 of the drivetrain assembly 12.

Figure 1A:
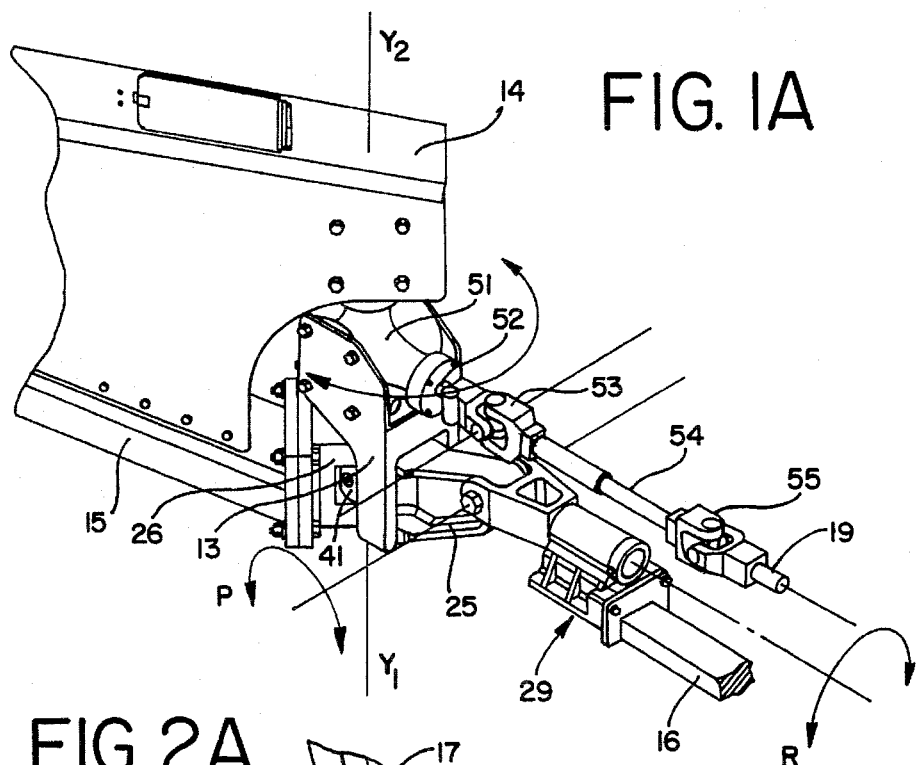
FIG. 1A is a perspective view similar to FIG. 1 illustrating operation of the swivel hitch and drivetrain during a right-hand turn.

It will be appreciated that, with the features of the invention as discussed herein, the implement draft and tongue load is transferred to the pulling vehicle through this swivel hitch assembly. The tongue clevis pin 28 allows the tongue extension 25 to rotate directly beneath gearbox 18 and its associated swivel gearbox 51 about a vertical axis Y1, which is directly in line with a vertical axis Y2 of the gearbox 18 and swivel gearbox 51. The connection at the tongue clevis pin 28 transmits the draft load and the tongue load to the tongue extension 25. Rotation about axis Y1 permits the implement to move either to the left or to the right, as generally illustrated in FIG. 1A, such as while negotiating a turn, behind the pulling vehicle. The tongue extension pin 23 allows rotation about an axis P, which permits the angle between the pulling vehicle and the implement to vary in the vertical plane, as generally illustrated in FIGS. 2A and 2B. The tongue load and implement draft is transmitted through tongue extension pin 23 to the clevis pin 22, 22A and drawbar adaptor 29. The effective tongue load on the pulling implement drawbar 16 is at the tongue extension pin 23. Clevis pin 22, 22A allows the pulling vehicle and implement to twist or roll with respect to each other, as generally illustrated in FIG. 3, along an axis R.

Referring more specifically to the drivetrain assembly 12, gearbox 18 is typically mounted onto the implement 14 and is driven by the power takeoff shaft 19 through the drivetrain assembly for the purpose of providing rotating drive power to the implement in order to operate on-board assemblies, such as combine mechanisms for achieving the tasks to be performed by the implement. Swivel gearbox 51, which is of generally known construction, transmits this rotational power along a generally perpendicular drive path between an implement input connection 52 and the gearbox 18. A universal joint 53 is positioned between the implement input connection 52 and a telescoping drivetrain shaft 54. A second universal joint 55 is positioned between the drivetrain shaft 54 and the power takeoff shaft 19.

Torque arms 13 or similar connecting members prevent the swivel gearbox 51 from freely rotating and maintain the orientation between this swivel gearbox to which it is secured and the tongue extension 25. Alternatively, maintaining this orientation can be achieved by securing the torque arm or the like to the tongue extension and having same engage the swivel gearbox. This orientation is maintained, for example, when the implement makes a turn as generally illustrated in FIG. 1A. Swivel gearbox 51 has a generally vertical axis of rotation Y2 (FIG. 1). It is especially preferred, as illustrated, that the tongue clevis pin 28 and the generally vertical shaft 56 of the swivel gearbox 51 (FIG. 2) are two separate shafts, even though their respective axes of rotation, Y1 and Y2, lie along the same vertical axis, but within two different horizontal locations. This arrangement avoids the possibility that loads borne by the swivel hitch assembly could be transmitted to the drivetrain assembly. In this regard, it will be noted that each torque arm 13 does not restrict relative up-and-down movement between tongue extension 25 and swivel gearbox 51 inasmuch as only two of these three components are rigidly secured together. Operative engagement between the torque arm and tongue extension in the illustrated embodiment is exclusively in a substantially horizontal direction.

Movement of the torque arms 13 is restrained by the tongue extension 25. The torque arms also maintain the orientation between the swivel gearbox 51 and the tongue extension 25. There is an insignificant amount of relative movement between the torque arms 13 and the tongue extension during turning or yaw movement (rotation about the Y1 axis), during pitch changes (rotation about the P axis), and during roll (rotation about the R axis).

The present invention maintains the implement input connection oriented toward the pulling vehicle drive shaft regardless of the orientation between the implement and the pulling vehicle. The swivel hitch assembly 11 allows for three degrees of freedom between the implement and the pulling vehicle. All of the implement draft and tongue load is transferred to the pulling vehicle through the swivel hitch assembly, while the drivetrain assembly absorbs the in-line thrust load developed by the telescoping action of the drivetrain shaft 54 and the torque required to operate the implement. Accordingly, the invention allows for excellent freedom of movement between the pulling vehicle and the implement without compromising the drivetrain assembly.

With more particular reference to FIG. 1A, this illustrates operation of the drivetrain and load bearing swivel hitch assembly such as when the pulling vehicle begins to negotiate a right turn. Tongue extension 25 rotates within the tongue clevis 26 along axis Y1. This hitch yaw movement is separated from and independent of roll or pitch movements of the hitch assembly along axis R or axis P. In addition, the swivel gearbox 51 moves with the tongue extension 25, and the implement input connection 52 is in line with the power takeoff shaft. Swivel gearbox 51 rotates about the Y2 axis. The mechanism would operate in the same manner during the negotiation of a left turn, for example.

FIG. 2A illustrates the operation of the drivetrain and load bearing swivel hitch assembly at a time when the pulling vehicle power takeoff shaft 19 is at a height greater than that of the implement input connection 52, such as when the pulling vehicle begins an ascent up a hill 61. The swivel hitch assembly rotates about its P axis along the tongue extension pin 23. This pitch movement is separated from the other two axes. At the same time, the universal joints 53, 55, associated with a compression of the telescoping drivetrain shaft 54, allow the drivetrain assembly to follow the pitch movement illustrated in FIG. 2A. It will be noted that the horizontal axis of the universal joint 53 preferably is not directly above the P axis of the torque extension pin 23 in order to better accommodate this pitch movement. Preferably, the P axis along torque extension pin 23 is slightly forward of the horizontal axis of the universal joint 53.

FIG. 2B illustrates the situation when the power takeoff shaft 19 moves to a location lower than that of the implement input connection 52, such as when the driving vehicle begins to enter a valley 62 or when the vehicle and the implement are on opposite sides of the crest 63 of a hill. In this instance, the telescoping drivetrain shaft 54 will typically extend somewhat, with the drivetrain assembly bending primarily along the horizontal axis of the universal joint 53.

FIG. 3 illustrates roll movement between the implement and pulling vehicle. In this instance, the pulling vehicle and the implement are rolling along respective surfaces that do not lie in the same plane, such as when one of the wheels 64 of the pulling vehicle is on a grade higher than the other wheel 65, which would occur when the one wheel is raised by a knoll 66 and before the implement 14 engages the knoll. FIG. 3 is somewhat schematic in that much of the implement and pulling vehicle are omitted and, for clarity, the components of the drivetrain assembly between the implement input connection 52 and the power takeoff shaft 19 are omitted. Roll along axis R of the clevis pin 22 is shown, wherein the drawbar adaptor 29 and its plate 32 follow the tongue 16 of the pulling vehicle, while the clevis pin 22 and the rest of the swivel hitch assembly rearwardly thereof remain with the roll orientation of the implement 14. This movement is separated from pitch and yaw operation. In order to accommodate this roll movement, either or both of universal joints 53, 55 reorient as needed, and the telescoping drivetrain shaft 54 elongates in order to accommodate the increased distance between the implement input connection 52 and the power takeoff shaft 19 during roll movement such as that illustrated in FIG. 3.

It will be appreciated that the drivetrain and load bearing swivel hitch assembly as illustrated herein effectively accomplishes an extension of the implement tongue while maintaining a vertical axis or yaw pivot beneath the swivel gearbox. This is accomplished in large measure by separating the three hitch movements of roll, pitch and yaw by using three entirely independent pins, one for each of the three movement axes. Any given pivot axis allows complete freedom for either roll, pitch or yaw, while rigidly restricting the other two. This is achieved while the tongue load at the tongue extension pin is close to the tractor drawbar and while the implement draft load through the clevis pin is closely spaced above the drawbar, which assists with tractor stability. This draft loading is particularly advantageous for implements such as combines which are relatively heavy when compared with lighter implements such as hay working tools.

Figure 6:
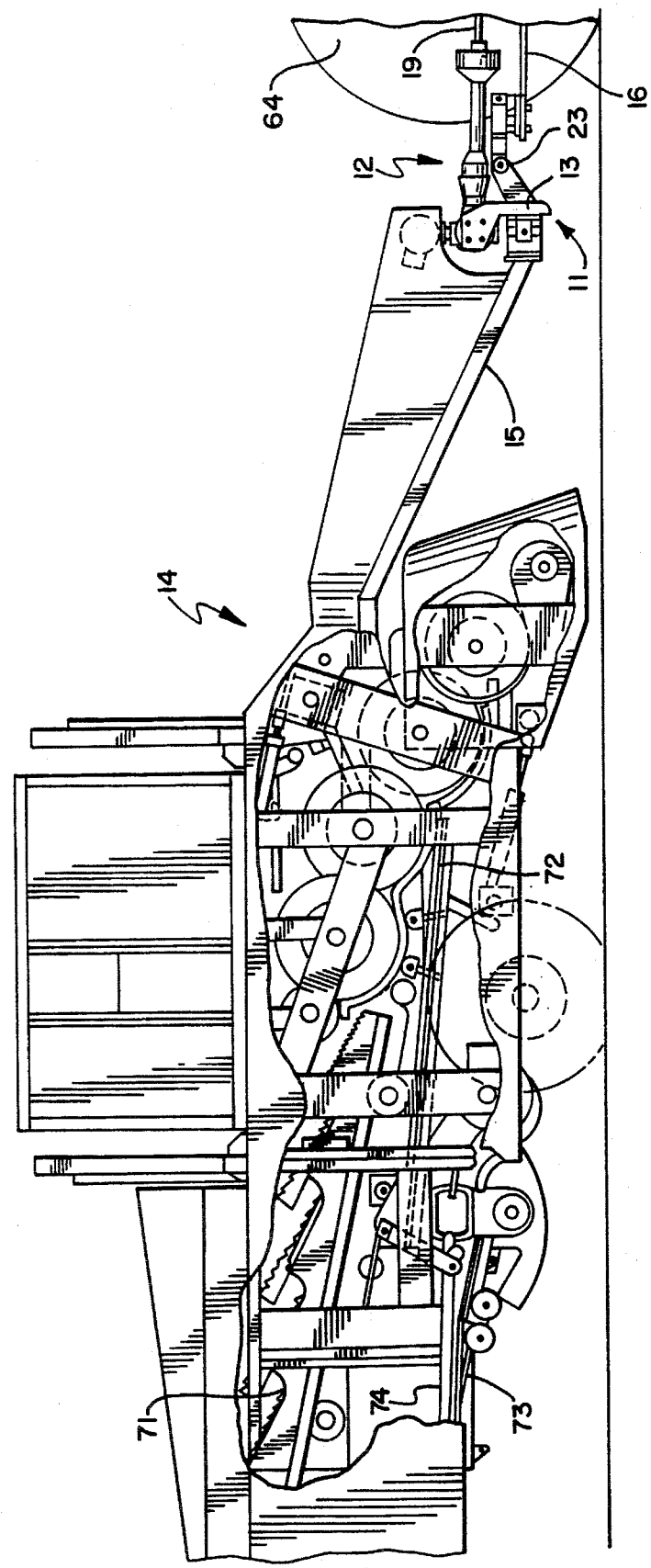
FIG. 6 is an elevational view of a combine in accordance with the present invention which incorporates the drivetrain and load bearing swivel hitch assembly.

FIG. 6 illustrates the type of implement which is particularly well suited for inclusion of the drivetrain and load bearing swivel hitch assembly discussed herein. The particular illustrated implement is a BUSH HOG® Model 9004 four-row peanut combine. Combine 14 includes tongue 15 that is secured to the load-bearing swivel hitch assembly 11 as discussed elsewhere herein. The various mechanisms within the combine are driven off of the power takeoff shaft 19 through the drivetrain assembly 12. It will be noted that the effective tongue load on the drawbar 16 of the pulling vehicle is at the tongue extension pin 23, and the combine is thereby hitched to the drawbar 16 at a horizontal level that will not vary, as could be the case were the attachment to a three-point hitch or the like. This feature avoids an undesirable result wherein the use of a three-point hitch attachment for some tractors could change the operating angle of the combine, which would seriously reduce the effectiveness of the combining process.

Illustrative combine operation mechanisms include straw walkers 71, pan 72, stemmer bottom 73 and cleaning screen 74. Each of these mechanisms receives and operates upon crop or crop byproducts such as stems, leaves, vines, and the like. The orientation of these mechanisms is important to the performance of the combine. The present drivetrain and load bearing swivel hitch assembly attachment to the drawbar helps maintain the orientation of these mechanisms at a proper operational angle, regardless of tractor make or model. For example, cleaning screen 74 is designed to run at an angle of about three degrees to five degrees below horizontal and to provide a rocking action to throw the peanuts rearwardly in the nature of an oscillating conveyor. If the operational angle is less than this tilt for which the combine is designed, the peanuts will move rearwardly in too short a period of time, with the result that they will not stay on the cleaning screen 74 long enough to be properly cleaned in accordance with an operation that is well known in the peanut combine art. This operating angle could be seriously disrupted if the peanut combine were mounted to a three point hitch of certain tractors or the like.

It will be understood that the embodiments of the present invention which have been described are illustrative of some of the applications of the principles of the present invention. Numerous modifications may be made by those skilled in the art without departing from the true spirit and scope of the invention.

We claim:

1. A combination comprising:

a pulling vehicle having a drawbar;

an agricultural implement combine having a frame component and a swivel hitch and drivetrain apparatus which includes:

a load bearing swivel hitch assembly which operatively connects the frame component of the combine directly to the drawbar of the pulling vehicle and avoids attachment to the pulling vehicle through a three-point hitch and attendant change in operating angle of the combine, the combine having a draft and tongue load which is transferred to the drawbar of the pulling vehicle through the load bearing swivel hitch assembly, the load bearing swivel hitch assembly having three separate axes of rotation, one axis of said axes of rotation being generally coaxial with the drawbar of the pulling vehicle, another axis of said axes of rotation being generally horizontal and transverse to said one axis, the other axis of said axes of rotation being generally vertical and transverse to said one axis, and a tongue extension rotates with respect to a tongue clevis along said other axis;

a drivetrain assembly having a swivel gearbox with a generally vertical rotation and drive axis parallel to said generally vertical other axis of rotation of the load bearing swivel hitch assembly, said drivetrain assembly also having a generally horizontal drive shaft assembly that is in driven connection between the pulling vehicle and said swivel gearbox, said drive shaft assembly having a substantially parallel relationship with respect to the drawbar of the pulling vehicle, which relationship remains constant during vertical movement of the pulling vehicle and combine with respect to each other; and a torque arm that is in operative engagement with both said tongue extension of the load bearing swivel hitch assembly and said swivel gearbox of the drivetrain assembly, whereby said tongue extension and swivel gearbox rotate substantially together with each other; and said swivel hitch assembly allows freedom of rotation of any one of said three separate axes while rigidly restricting rotation along the other two of said three separate axes.

2. The swivel hitch and drivetrain apparatus in accordance with claim 1, wherein said drivetrain assembly carries no substantial load component from the implement.

3. The swivel hitch and drivetrain apparatus in accordance with claim 1, wherein the generally vertical rotation axis of the drivetrain is substantially coincident with said generally vertical other axis of rotation of the load bearing swivel hitch assembly, and wherein the generally vertical rotation axis of the drivetrain is along a shaft that is separate from and unconnected to a shaft of the load bearing swivel hitch assembly along which the generally vertical other axis of rotation of the swivel hitch assembly lies.

4. The swivel hitch and drivetrain apparatus in accordance with claim 1, wherein said load bearing swivel hitch assembly includes a tongue extension pin which bears virtually all of the implement load, the tongue extension pin being along said another axis of rotation that is generally horizontal and transverse to said one axis, said tongue extension which is pivotable along said other axis is not pivotable along either said another axis or an axis parallel to said another axis, and said load bearing swivel hitch assembly further includes an adaptor assembly secured to the drawbar of the vehicle, said adaptor assembly having an adaptor component being pivotable along said one axis and not pivotable about either said another axis or an axis parallel to said another axis.

5. The swivel hitch and drivetrain apparatus in accordance with claim 4, wherein said another axis is a pitch axis P, said one axis is a roll axis R, and said other axis that is generally vertical and transverse to said one axis R is a yaw axis Y1

6. The swivel hitch and drivetrain apparatus in accordance with claim 1, wherein the apparatus separates the load carrying function from the power transmitting function, and wherein the load carrying function is substantially exclusively accomplished by the load bearing swivel hitch assembly and the power transmitting function is accomplished by the drivetrain assembly.

7. The swivel hitch and drivetrain apparatus in accordance with claim 1, wherein said one axis of the load bearing swivel hitch assembly lies along a clevis pin of an adaptor assembly, said adaptor assembly including an adaptor member rigidly secured to the drawbar of the pulling vehicle and having a tube component rotatably receiving said clevis pin being attached to a clevis that is rotatable about said another axis relative to said tongue extension, and wherein said other axis is a yaw axis Y1 providing relative rotation between said tongue extension and said tongue clevis.

8. The swivel hitch and drivetrain apparatus in accordance with claim 1, wherein said generally horizontal drive shaft assembly includes a telescoping drive shaft.

9. The swivel hitch and drivetrain apparatus in accordance with claim 8, wherein said generally horizontal drive shaft assembly further includes a universal joint between the telescoping drive shaft and the power takeoff shaft and another universal joint between said telescoping drive shaft and said swivel gearbox.

10. A combination comprising:
a pulling vehicle having a drawbar and a power takeoff shaft;
a combine having a surface that receives crop or crop byproduct, which surface has an operational angle with respect to horizontal that falls within an optimum range of angles, the combine having a tongue and a swivel hitch and drivetrain apparatus which includes:
a swivel hitch assembly which operatively connects said tongue of the combine to the drawbar of the pulling vehicle and avoids attachment to the pulling vehicle through a three-point hitch and attendant change in operating angle of the combine, the swivel hitch assembly having three separate axes of rotation, one of said axes of rotation being a roll axis generally coaxial with the drawbar of the pulling vehicle, another of said axes of rotation being a pitch axis generally horizontal and transverse to said roll axis, and the other of said axes of rotation being a yaw axis generally vertical and transverse to said roll axis;
a drivetrain assembly having a swivel gearbox with a generally vertical rotation and drive axis parallel to said yaw axis of the swivel hitch assembly, said drivetrain assembly also having a generally horizontal drive shaft assembly that is in driven connection with the power takeoff shaft of the pulling vehicle, said drive shaft assembly having a substantially parallel relationship with respect to the drawbar of the pulling vehicle, which relationship remains constant during vertical movement of the pulling vehicle and combine with respect to each other;
a torque arm that is in operative engagement with both said swivel gearbox of the drivetrain assembly and a tongue component of the swivel hitch assembly that rotates along said yaw axis, whereby said swivel gearbox and said tongue component rotate substantially with each other; and
said swivel hitch assembly allows freedom of rotation of any one of the roll, pitch or yaw axes while rigidly restricting rotation along the other two of said roll, pitch or yaw axes; and
said swivel hitch assembly constantly maintains said combine at an orientation with respect to the vehicle whereby the surface of the combine which receives crop or crop byproduct presents its operational angle during pulling of the combine by the vehicle.

11. The combine in accordance with claim 10, wherein said torque arm operative engagement is exclusively substantially horizontally directed and said drivetrain assembly carries no substantial load component from the combine.

12. The combine in accordance with claim 10, wherein the generally vertical rotation axis of the drivetrain is substantially coincident with said yaw axis of the swivel hitch assembly, and wherein the generally vertical rotation axis of the drivetrain is along a shaft that is separate from and unconnected to a shaft of the swivel hitch assembly defining said yaw axis.

13. The combine in accordance with claim 10, wherein said swivel hitch assembly includes a tongue extension pin which bears virtually all of the implement load, the tongue extension pin being along said pitch axis, said swivel hitch assembly further including a tongue extension that is pivotable along said yaw axis and is not pivotable along either said pitch axis or an axis parallel to said pitch axis, and said swivel hitch assembly further includes an adaptor assembly secured to the drawbar of the vehicle, said adaptor assembly having an adaptor component pivotable along said roll axis and not pivotable about either said pitch axis or an axis parallel to said pitch axis.

14. The combine in accordance with claim 10, wherein the apparatus separates the load carrying function from the power transmitting function, and wherein the load carrying function is substantially exclusively accomplished by the swivel hitch assembly and the power transmitting function is accomplished by the drivetrain assembly.

15. The combine in accordance with claim 10, wherein said roll axis of the swivel hitch assembly lies along a clevis pin of an adaptor assembly, said adaptor assembly including an adaptor member rigidly secured to the drawbar of the pulling vehicle and having a tube component rotatably receiving said clevis pin being attached to a clevis that is rotatable about said pitch axis, said pitch axis being through said tongue component, and wherein said yaw axis provides relative rotation between said tongue component and said clevis.

16. The combine in accordance with claim 10, wherein said generally horizontal drive shaft assembly includes a telescoping drive shaft.

17. The combine in accordance with claim 16, wherein said generally horizontal drive shaft assembly further includes a universal joint between the telescoping drive shaft and the power takeoff shaft and another universal joint between said telescoping drive shaft and said swivel gearbox.

18. The combine in accordance with claim 10, wherein said combine is a peanut combine.

19. A combination comprising:
a pulling vehicle having a drawbar;
an agricultural implement combine having a frame component and a swivel hitch and drivetrain apparatus which includes:

a load bearing swivel hitch assembly operatively connecting the frame component of the combine directly to the drawbar of the pulling vehicle and avoids attachment to the pulling vehicle through a three-point hitch and attendant change in operating angle of the combine, the combine having a draft and tongue load which is transferred to the drawbar of the pulling vehicle through the load bearing swivel hitch assembly, the load bearing swivel hitch assembly having three-separate axes of rotation, one axis of said axes of rotation being generally coaxial with the drawbar of the pulling vehicle, another axis of said axes of rotation being generally horizontal and transverse to said one axis, the other axis of said axes of rotation being generally vertical and transverse to said one axis, and a tongue extension rotates with respect to a tongue clevis along said other axis;

a drivetrain assembly having a swivel gearbox with a generally vertical rotation and drive axis parallel to said generally vertical other axis of rotation of the load bearing swivel hitch assembly, said drivetrain assembly also having a generally horizontal drive shaft assembly that is in driven connection between the pulling vehicle and said swivel gearbox, said drive shaft assembly having a substantially parallel relationship with respect to the drawbar of the pulling vehicle, which relationship remains constant during vertical movement of the pulling vehicle and combine with respect to each other; and a torque arm that is in operative engagement with both said tongue extension of the load bearing swivel hitch assembly and said swivel gearbox of the drivetrain assembly, whereby said tongue extension and swivel gearbox rotate substantially together with each other; and said torque arm operative engagement is exclusively substantially horizontally directed to the effect that said drivetrain assembly carries no substantial load component from the combine.

20. The swivel hitch and drivetrain apparatus in accordance with claim 19, wherein the generally vertical rotation axis of the drivetrain is substantially coincident with said generally vertical other axis of rotation of the load bearing swivel hitch assembly, and wherein the generally vertical rotation axis of the drivetrain is along a shaft that is separate from and unconnected to a shaft of the load bearing swivel hitch assembly along which the generally vertical other axis of rotation of the swivel hitch assembly lies.

21. The swivel hitch and drivetrain apparatus in accordance with claim 19, wherein said load bearing swivel hitch assembly includes a tongue extension pin which bears virtually all of the combine load, the tongue extension pin being along said another axis of rotation that is generally horizontal and transverse to said one axis, said tongue extension which is pivotable along said other axis is not pivotable along either said another axis or an axis parallel to said another axis, and said load bearing swivel hitch assembly further includes an adaptor assembly secured to the drawbar of the vehicle, said adaptor assembly having an adaptor component being pivotable along said one axis and not pivotable about either said another axis or an axis parallel to said another axis.

22. The swivel hitch and drivetrain apparatus in accordance with claim 21, wherein said another axis is a pitch axis P, said one axis is a roll axis R, and said other axis that is generally vertical and transverse to said one axis R is a yaw axis Y1.

23. The swivel hitch and drivetrain apparatus in accordance with claim 19, wherein said one axis of the load bearing swivel hitch assembly lies along a clevis pin of an adaptor assembly, said adaptor assembly including an adaptor member rigidly secured to the drawbar of the pulling vehicle and having a tube component rotatably receiving said clevis pin being attached to a clevis that is rotatable about said another axis relative to said tongue extension, and wherein said other axis is a yaw axis Y1 providing relative rotation between said tongue extension and said tongue clevis.

24. The swivel hitch and drivetrain apparatus in accordance with claim 19, wherein said generally horizontal drive shaft assembly includes a telescoping drive shaft, and said generally horizontal drive shaft assembly further includes a universal joint between the telescoping drive shaft and the power takeoff shaft and another universal joint between said telescoping drive shaft and said swivel gearbox.

25. A combination comprising:

a pulling vehicle having a drawbar and a power takeoff shaft;

a combine having a surface that receives crop or crop byproduct, which surface has an operational angle with respect to horizontal that falls within an optimum range of angles, the combine having a frame component and a swivel hitch and drivetrain apparatus which includes:

a swivel hitch assembly operatively connecting the frame component of the combine directly to the drawbar of the pulling vehicle and avoids attachment to the pulling vehicle through a three-point hitch and attendant change in operating angle of the combine, the swivel hitch assembly having three separate axes of rotation, one of said axes of rotation being a roll axis generally coaxial with the drawbar of the pulling vehicle, another of said axes of rotation being a pitch axis generally horizontal and transverse to said roll axis, and the other of said axes of rotation being a yaw axis generally vertical and transverse to said roll axis;

a drivetrain assembly having a swivel gearbox with a generally vertical rotation and drive axis parallel to said yaw axis of the swivel hitch assembly, said drivetrain assembly also having a generally horizontal drive shaft assembly that is in driven connection with the power takeoff shaft of the pulling vehicle;

a torque arm that is in operative engagement with both said swivel gearbox of the drivetrain assembly and a tongue component of the swivel hitch assembly that rotates along said yaw axis, whereby said swivel gearbox and said tongue component rotate substantially with each other; and said torque arm operative engagement is exclusively substantially horizontally directed to the effect that said drivetrain assembly carries no substantial load component from the combine; and said swivel hitch assembly constantly maintains said combine at an orientation with respect to the vehicle whereby the surface of the combine which receives crop or crop byproduct presents its operational angle during pulling of the combine by the vehicle.

26. The combine in accordance with claim 25, wherein the generally vertical rotation axis of the drivetrain is substantially coincident with said yaw axis of the swivel hitch assembly, and wherein the generally vertical rotation axis of the drivetrain is along a shaft that is separate from and unconnected to a shaft of the swivel hitch assembly defining said yaw axis.

27. The combine in accordance with claim 25, wherein said swivel hitch assembly includes a tongue extension pin which bears virtually all of the implement load, the tongue extension pin being along said pitch axis, said swivel hitch assembly further including a tongue extension that is pivotable along said yaw axis and is not pivotable along either said pitch axis or an axis parallel to said pitch axis, and said swivel hitch assembly further includes an adaptor assembly secured to the drawbar of the pulling vehicle, said adaptor assembly having an adaptor component pivotable along said roll axis and not pivotable about either said pitch axis or an axis parallel to said pitch axis.

28. The combine in accordance with claim 25, wherein said roll axis of the swivel hitch assembly lies along a clevis pin of an adaptor assembly, said adaptor assembly including an adaptor member rigidly secured to the drawbar of the pulling vehicle and having a tube component rotatably receiving said clevis pin being attached to a clevis that is rotatable about said pitch axis, said pitch axis being through said tongue component, and wherein said yaw axis provides relative rotation between said tongue component and said clevis.

29. The combine in accordance with claim 25, wherein said generally horizontal drive shaft assembly includes a telescoping drive shaft, and wherein said generally horizontal drive shaft assembly further includes a universal joint between the telescoping drive shaft and the power takeoff shaft and another universal joint between said telescoping drive shaft and said swivel gearbox.

30. The combine in accordance with claim 25, wherein said combine is a peanut combine, and wherein said combine surface having the operational angle receives peanut crop or peanut crop byproduct.

* * * * *

UNITED STATES PATENT AND TRADEMARK OFFICE
CERTIFICATE OF CORRECTION

PATENT NO.  : 5,531,283
DATED       : July 2, 1996
INVENTOR(S) : Gregg A. Austin and Gary E. Coppock It is certified that error appears in the above-indentified patent and that said Letters Patent is hereby corrected as shown below:

```
On the Cover Page, in the title, line 2, delete "ASSEMBY" and insert
    --ASSEMBLY--; under "References Cited", "Other Publications,"
    line 12, "AMG 282 Z2 of C" should read --AMG 282 Z or C--.
Col. 1, line 2, delete "ASSEMBY" and insert --ASSEMBLY--.
Col. 4, line 6, delete "Joins" and insert --joins--; line 31,
    "the. drawbar" should read --the drawbar--; line 54, "20" should
    not be in bold print; line 57, "21" should not be in bold print.
Col. 6, line 22, "shaft Swivel" should read --shaft 19. Swivel--.
Col. 9, line 7, insert a period --.-- after "Y1".
Col. 11, line 10, "three-separate" should read --three separate--.
```

Signed and Sealed this

Twenty-second Day of October, 1996

Attest:

BRUCE LEHMAN

*Attesting Officer*   Commissioner of Patents and Trademarks